United States Patent
Ko et al.

(10) Patent No.: US 12,437,803 B2
(45) Date of Patent: Oct. 7, 2025

(54) BUFFER CHIP, SEMICONDUCTOR PACKAGE INCLUDING BUFFER CHIP AND MEMORY CHIP, OPERATION METHOD OF BUFFER CHIP, AND OPERATION METHOD OF SEMICONDUCTOR PACKAGE

(71) Applicant: SK hynix Inc., Gyeonggi-do (KR)

(72) Inventors: Geon Ko, Gyeonggi-do (KR); Choung Ki Song, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 161 days.

(21) Appl. No.: 18/509,315

(22) Filed: Nov. 15, 2023

(65) Prior Publication Data

US 2025/0078908 A1    Mar. 6, 2025

(30) Foreign Application Priority Data

Sep. 1, 2023 (KR) .................. 10-2023-0115962

(51) Int. Cl.
| | |
|---|---|
| G11C 11/4093 | (2006.01) |
| H01L 25/065 | (2023.01) |
| H01L 25/18 | (2023.01) |
| H10B 80/00 | (2023.01) |

(52) U.S. Cl.
CPC ...... *G11C 11/4093* (2013.01); *H01L 25/0657* (2013.01); *H01L 25/18* (2013.01); *H10B 80/00* (2023.02); *H01L 2225/0651* (2013.01)

(58) Field of Classification Search
CPC ..... G11C 11/4093; G11C 7/1084; G11C 8/06; G11C 8/10; H01L 25/0657; H01L 25/18; H01L 2225/0651; H10B 80/00
USPC ............................. 365/189.05, 189.09
See application file for complete search history.

(56) References Cited

U.S. PATENT DOCUMENTS

| | | | | |
|---|---|---|---|---|
| 5,694,370 | A   * | 12/1997 | Yoon ................ | G11C 7/1051 |
| | | | | 365/233.5 |
| 2012/0081982 | A1 * | 4/2012 | Yi .................. | G11C 29/022 |
| | | | | 365/194 |
| 2012/0126857 | A1 * | 5/2012 | Ko ................... | G11C 8/06 |
| | | | | 327/108 |
| 2017/0186470 | A1 * | 6/2017 | Lee ................. | G11C 7/222 |
| 2017/0372764 | A1 * | 12/2017 | Ahn ................. | G11C 11/1693 |
| 2019/0304519 | A1 * | 10/2019 | Kim ................. | G11C 7/062 |

(Continued)

FOREIGN PATENT DOCUMENTS

KR  10-2018-0102268 A  9/2018

*Primary Examiner* — Michael T Tran
(74) *Attorney, Agent, or Firm* — IP & T GROUP LLP

(57) ABSTRACT

An operation method of a buffer chip may include receiving first control signals for setting a first memory chip; buffering the first control signals and transmitting the buffered signals to the first memory chip; storing a setting value of the first memory chip in response to the first control signals; receiving second control signals for setting a second memory chip; buffering the second control signals and transmitting the buffered second control signals to the second memory chip; storing a setting value of the second memory chip in response to the second control signals; receiving third control signals for applying the setting value of the first memory chip; buffering the third control signals and transmitting the buffered third control signals to the first memory chip; and applying the stored setting value of the first memory chip as a setting value of a buffer chip in response to the third control signals.

12 Claims, 10 Drawing Sheets

(56) References Cited

U.S. PATENT DOCUMENTS

| | | | |
|---|---|---|---|
| 2019/0355436 A1* | 11/2019 | Shin | G11C 29/1201 |
| 2020/0167298 A1* | 5/2020 | Yang | G06F 3/0683 |
| 2022/0148629 A1* | 5/2022 | Park | G11C 7/1063 |
| 2022/0413768 A1 | 12/2022 | Lee et al. | |

* cited by examiner

BUFFER CHIP, SEMICONDUCTOR PACKAGE INCLUDING BUFFER CHIP AND MEMORY CHIP, OPERATION METHOD OF BUFFER CHIP, AND OPERATION METHOD OF SEMICONDUCTOR PACKAGE

CROSS-REFERENCE TO RELATED APPLICATION

This application claims priority under 35 U.S.C. § 119 (a) to Korean Patent Application No. 10-2023-0115962 filed on Sep. 1, 2023, which are incorporated herein by reference in its entirety.

BACKGROUND

1. Technical Field

Embodiments of the present disclosure relate to a semiconductor package including a buffer chip and a memory chip, and a memory module including the same.

2. Related Art

Recently, as application fields utilizing artificial intelligence (AI) and big data increase, the amount of data to be processed is explosively increasing. Many computer systems such as data centers, servers, and the like require a large amount of memory, and applications using the computer systems require a larger amount of memory than system capabilities. However, it is difficult to add memory to the computer system due to a limitation in latency and bandwidth. Various methods for increasing the amount of memory in a system while maintaining low latency and high bandwidth are being studied.

SUMMARY

In an embodiment of the present disclosure, an operation method of a buffer chip may include: receiving first control signals for setting a first memory chip; buffering the first control signals and transmitting the buffered first control signals to the first memory chip; storing a setting value for the first memory chip in response to the first control signals; receiving second control signals for setting a second memory chip; buffering the second control signals and transmitting the buffered second control signals to the second memory chip; storing a setting value for the second memory chip in response to the second control signals; receiving third control signals for applying the setting value for the first memory chip; buffering the third control signals and transmitting the buffered third control signals to the first memory chip; and applying the stored setting value for the first memory chip as a setting value of the buffer chip in response to the third control signals.

In an embodiment of the present disclosure, an operation method of a semiconductor package may include: receiving, by a buffer chip, first control signals for setting a first memory chip; buffering, by the buffer chip, the first control signals and transmitting the buffered first control signals to the first memory chip; storing, by the buffer chip, a setting value for the first memory chip in response to the first control signals; storing, by the first memory chip, the setting value for the first memory chip in response to the first control signals; receiving, by the buffer chip, second control signals for setting a second memory chip; buffering, by the buffer chip, the second control signals and transmitting the buffered second control signals to the second memory chip; storing, by the buffer chip, a setting value for the second memory chip in response to the second control signals; storing, by the second memory chip, the setting value for the second memory chip in response to the second control signals; receiving, by the buffer chip, third control signals for applying the setting value for the second memory chip; buffering, by the buffer chip, the third control signals and transmitting the buffered third control signals to the second memory chip; applying, by the buffer chip, the stored setting value for the second memory chip as a setting value of the buffer chip in response to the third control signals; and applying, by the second memory chip, the stored setting value for the second memory chip as the setting value for the second memory chip in response to the third control signals.

In an embodiment of the present disclosure, a buffer chip may include: a first command decoder configured to decode a first chip select signal and command address signals; a second command decoder configured to decode a second chip select signal and the command address signals; a first setting circuit configured to store setting values for a first memory chip according to a decoding result of the first command decoder; a second setting circuit configured to store setting values for a second memory chip according to a decoding result of the second command decoder; and a buffer chip setting circuit configured to: when application of the setting value for the first memory chip is instructed, receive one or more of the setting values stored in the first setting circuit and store the received setting value as a buffer chip setting value; and when application of the setting value for the second memory chip is instructed, receive one or more of the setting values stored in the second setting circuit and store the received setting value as the buffer chip setting value.

In an embodiment of the present disclosure, a semiconductor package may include: a buffer chip; a first memory chip configured to communicate with a memory controller through the buffer chip; and a second memory chip configured to communicate with the memory controller through the buffer chip, wherein the buffer chip comprises: a first command decoder configured to decode a first chip select signal and command address signals; a second command decoder configured to decode a second chip select signal and the command address signals; a first setting circuit configured to store setting values for the first memory chip according to a decoding result of the first command decoder; a second setting circuit configured to store setting values for the second memory chip according to a decoding result of the second command decoder; and a buffer chip setting circuit configured to when application of the setting value for the first memory chip is instructed, receive one or more of the setting values stored in the first setting circuit and store the received setting value as a buffer chip setting value, and when application of the setting value for the second memory chip is instructed, receive one or more of the setting values stored in the second setting circuit and store the received setting value as the buffer chip setting value.

These and other features and advantages of the invention will become apparent from the detailed description of embodiments of the disclosure and the following figures.

DETAILED DESCRIPTION

Various embodiments of the present disclosure are directed to providing a technology of setting a buffer chip.

Embodiments of the present disclosure may set a buffer chip to an appropriate setting value.

Hereafter, embodiments in accordance with the technical spirit of the present disclosure will be described with reference to the accompanying drawings.

Figure 1:
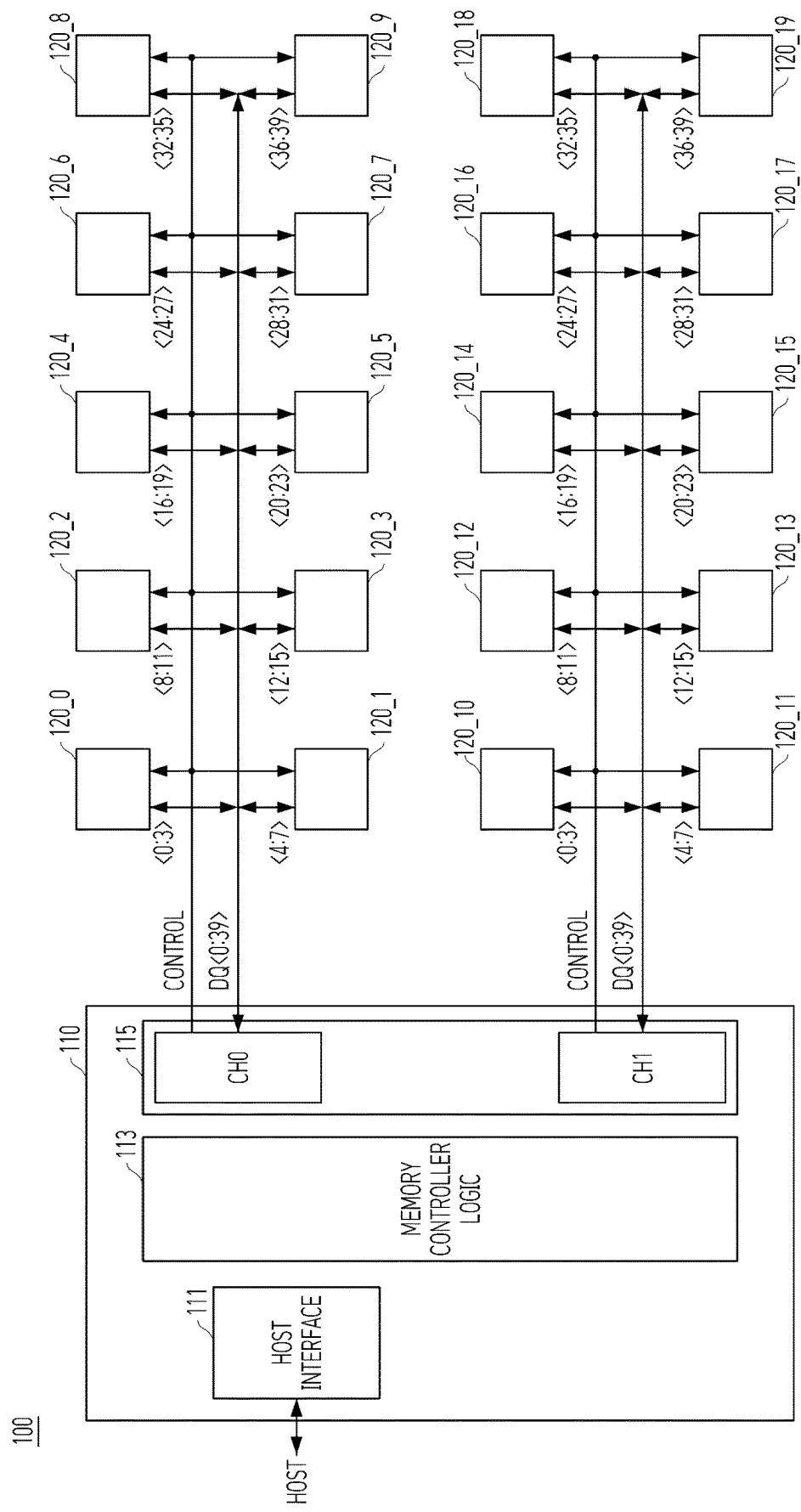
FIG. 1 is a diagram illustrating a configuration of a memory module in accordance with an embodiment of the present disclosure.

FIG. 1 is a diagram illustrating a configuration of a memory module 100 in accordance with an embodiment of the present disclosure.

Referring to FIG. 1, the memory module 100 may include a module controller 110 and a plurality of memory packages 120_0 to 120_19.

The module controller 110 may include a host interface 111, a memory controller logic 113, and a memory interface 115. The memory controller logic 113 and the memory interface 115 may also be referred to as a memory controller.

The host interface 111 may be used for communication between the module controller 110 and a host (e.g., a computer system). The host interface 111 may be a compute express link (CXL) interface. The CXL interface is an interface based on peripheral component interconnect express (PCIe), and may be an interface through which a central processing unit (CPU), a graphic processing unit (GPU), and various types of accelerators more efficiently use a memory. By connecting the memory module 100 to the host through the CXL interface, the memory capacity of a computer system such as a data center and a server may be increased, and various processors in the computer system may share the memory.

The memory controller logic 113 may be a logic for controlling the memory packages 120_0 to 120_19, and the memory interface 115 may be an interface for communication with the memory packages 120_0 to 120_19. The memory interface 115 may include two channels CH0 and CH1. Ten memory packages (i.e., a first memory package group) 120_0 to 120_9 may be connected to the channel CH0 of the memory interface 115, and the other memory packages 120_10 to 120_19 (i.e., a second memory package group) may be connected to the channel CH1.

The channel CH0 of the memory interface 115 may be connected to the first memory package group 120_0 to 120_9 through 40 data lines DQ<0:39>. Four different data lines may be connected to the first memory package group 120_0 to 120_9. For example, four data lines DQ<0:3> may be connected to the memory package 120_0, and four data lines DQ<4:7> may be connected to the memory package 120_1.

The channel CH0 of the memory interface 115 may be connected to the first memory package group 120_0 to 120_9 through control signal transmission lines CONTROL. The control signal transmission lines CONTROL may include a plurality of lines, and may be common to the first memory package group 120_0 to 120_9. For example, all of the control signal transmission lines CONTROL may be connected to the memory package 120_0 and may also be connected to the memory package 120_1. Although not illustrated in the drawing, lines for transmitting clocks and data strobe signals may be further connected between the channel CH0 of the memory interface 115 and the first memory package group 120_0 to 120_9.

The channel CH1 of the memory interface 115 and the second memory package group 120_10 to 120_19 may be connected in the same way as the channel CH0 and the first memory package group 120_0 to 120_9.

Each of the memory packages 120_0 to 120_19 may include one or more memory chips (for example, DRAM chips). Because one of the important reasons for using the memory module 100 is to greatly increase the capacity of a memory, generally each of the memory packages 120_0 to 120_19 includes a plurality of memory chips. As one of the methods of putting a plurality of memory chips into a memory package, a method such as 3 dimensional stacking (3DS) has been used. The 3DS method may use a through-silicon via (TSV) for communication between memory chips in a memory package. However, when a memory package is manufactured in this way, the price of the memory package may increase because a lot of time and cost are required in packaging.

In the memory module 100, each of the memory packages 120_0 to 120_19 may include a buffer chip and a plurality of memory chips. The buffer chip may perform a buffer operation between the module controller 110 and the plurality of memory chips. The plurality of memory chips included in each of the memory packages 120_0 to 120_19 may be connected to the buffer chip through wire bonding.

The memory module 100 may increase a memory capacity by using the plurality of memory chips and reduce loading due to an increase in memory by using a buffer chip.

However, the configuration of the memory packages 120_0 to 120_19 disclosed in the present disclosure is merely an example and might not be limited thereto. For example, each of the memory packages 120_0 to 120_19 may include different types of memory chips. For example, at least one of the memory packages 120_0 to 120_19 may have a different configuration from other memory packages and/or may be connected to the module controller 110 in a different way. For example, memory chips included in at least one of the memory packages 120_0 to 120_19 may be integrated using a 3 dimensional stacking (3DS) method, a monolithic 3D (M3D) method, or the like. For example, memory chips included in at least one of the memory packages 120_0 to 120_19 may communicate with each other by using through-silicon vias (TSVs) or vias with a smaller size and higher density than the TSVs.

The form factor of the memory module 100 may have various forms such as an add-in-card (AIC) and an enterprise and data center SSD form factor (EDSFF).

Figure 2:
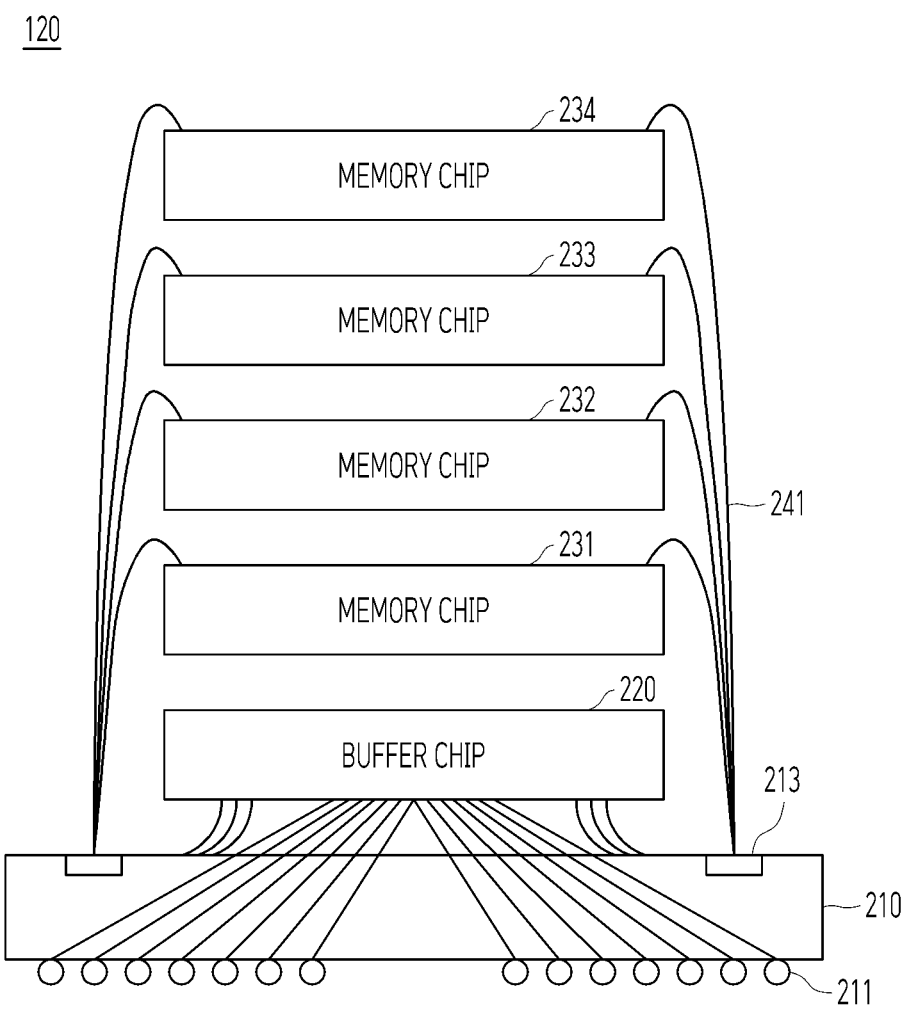
FIG. 2 is a diagram illustrating a detailed configuration of a memory package shown in FIG. 1 in accordance with an embodiment of the present disclosure.

FIG. 2 is a diagram illustrating a detailed configuration of the memory package 120 shown in FIG. 1 in accordance with an embodiment of the present disclosure.

Referring to FIG. 2, the memory package 120 may include a package substrate 210, a buffer chip 220, and a plurality of memory chips 231 to 234.

The package substrate 210 may include a plurality of package balls 211 that are terminals for communication with the memory interface 115 (FIG. 1) and a plurality of bonding pads 213 for communication inside the memory package 120.

The buffer chip 220 may be disposed on the package substrate 210. The buffer chip 220 may communicate with the memory interface 115 (FIG. 1) through the package balls 211 of the package substrate 210. The buffer chip 220 may further communicate with the memory chips 231 to 234 through the bonding pads 213 of the package substrate 210.

The memory chips 231 to 234 may be stacked on the buffer chip 220, and may communicate with the buffer chip 220 through wires 241 connecting the bonding pads 213 and the memory chips 231 to 234. The memory chips 231 to 234 may communicate with the memory interface 115 (FIG. 1) through the buffer chip 220. Control signals CONTROL (FIG. 1) and data DQ<0:39> (FIG. 1) transmitted from the memory interface 115 (FIG. 1) may be transmitted to the buffer chip 220 through the package balls 211, buffered, and then transmitted from the buffer chip 220 to the memory chips 231 to 234 through the bonding pads 213. Data transmitted from the memory chips 231 to 234 may be transmitted to the buffer chip 220 through the bonding pads 213, buffered, and then transmitted to the memory interface 115 (FIG. 1) through the package balls 211.

Because only the buffer chip 220 among the chips of the memory package 120 may be connected to the memory interface 115 (FIG. 1), loading between the memory package 120 and the memory interface 115 (FIG. 1) may be reduced to enable a high-speed operation. Because the buffer chip 220 and the memory chips 231 to 234 are connected through wiring instead of a TSV that consumes a lot of cost in a manufacturing process, the manufacturing cost of the memory package 120 may be reduced.

Figure 3:
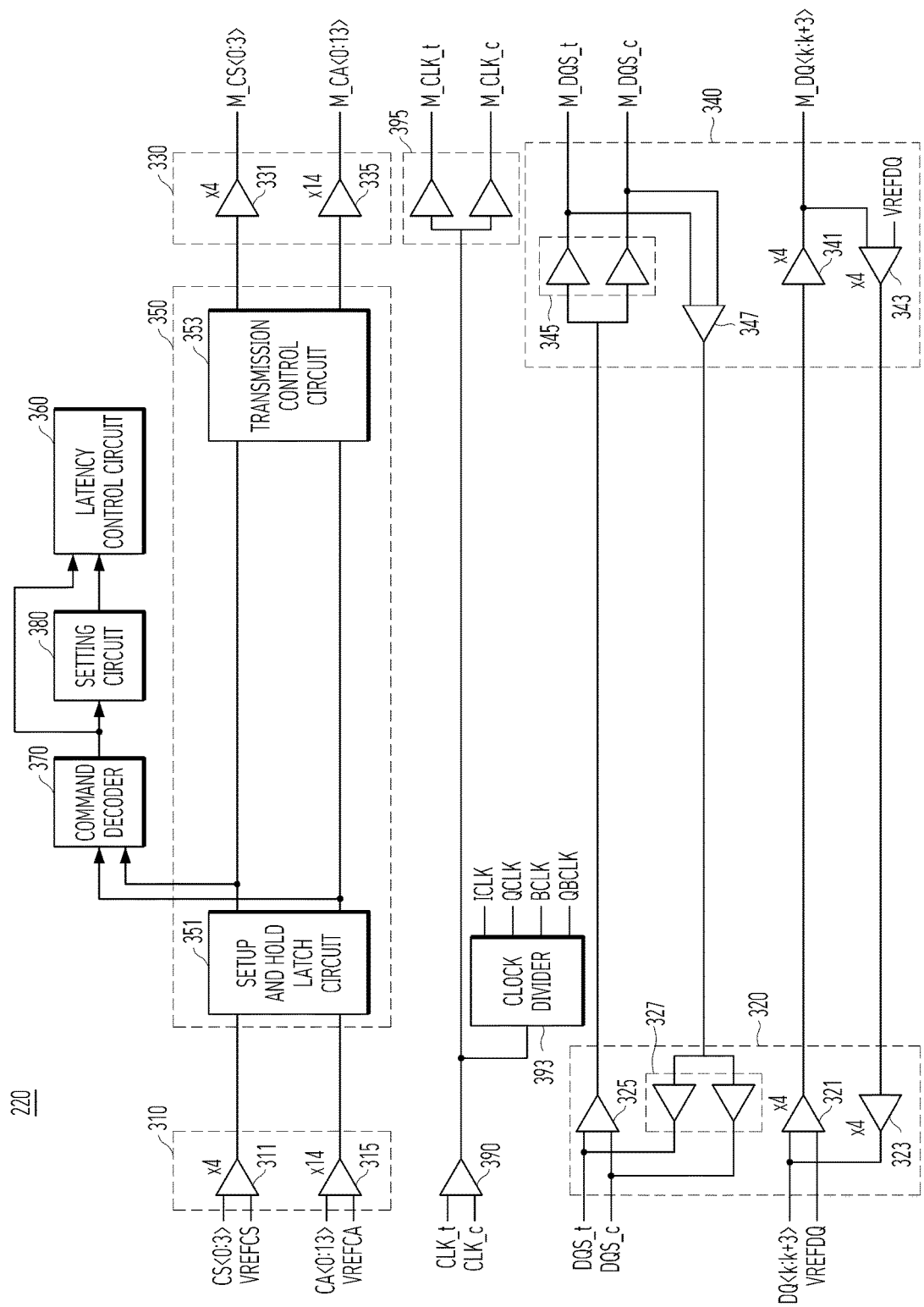
FIG. 3 is a diagram illustrating a detailed configuration of a buffer chip shown in FIG. 2 in accordance with an embodiment of the present disclosure.

FIG. 3 is a diagram illustrating a detailed configuration of the buffer chip 220 shown in FIG. 2 in accordance with an embodiment of the present disclosure.

Referring to FIG. 3, the buffer chip 220 may include an external control signal interface 310, an external data interface 320, an internal control signal interface 330, an internal data interface 340, a control signal transmission circuit 350, a latency control circuit 360, a command decoder 370, a setting circuit 380, a clock reception circuit 390, a clock divider 393, and a clock transmission circuit 395.

The external control signal interface 310 may receive the control signals CONTROL (FIG. 1) transmitted from the memory interface 115 (FIG. 1). The control signals CONTROL (FIG. 1) may include chip select signals CS<0:3> and command address signals CA<0:13>. The external control signal interface 310 may include a chip select signal reception circuit 311 and a command address reception circuit 315.

The chip select signals CS<0:3> are used for distinguishing the memory chips 231 to 234 (FIG. 2) in the memory package 120 (FIG. 2), that is, for distinguishing ranks, and the number of chip select signals CS<0:3> may be the same as the number of the memory chips 231 to 234 (FIG. 2) in the memory package 120 (FIG. 2). In FIG. 3, because the number of chip select signals CS<0:3> is illustrated as 4, the chip select signal reception circuit 311 may include four reception buffers. The buffers of the chip select signal reception circuit 311 may receive the chip select signals CS<0:3> by comparing voltage levels of the chip selection reference voltage VREFCS and the chip select signals CS<0:3> with each other.

The command address reception circuit 315 may include the same number of reception buffers as the number of command address signals CA<0:13>. In FIG. 3, because the number of command address signals CA<0:13> is illustrated as 14, the command address reception circuit 315 may include 14 reception buffers. The buffers of the command address reception circuit 315 may receive the command address signals CA<0:13> by comparing voltage levels of a command address reference voltage VREFCA and the command address signals CA<0:13> with each other.

The external data interface 320 may transmit/receive data DQ<k:k+3>, where K is an integer equal to or greater than 0, to/from the memory interface 115 (FIG. 1). The external data interface 320 may transmit/receive not only the data DQ<k:k+3> but also data strobe signals DQS_t and DQS_c for strobing the data DQ<k:k+3>. The external data interface 320 may include an external data reception circuit 321, an external data transmission circuit 323, an external data strobe reception circuit 325, and an external data strobe transmission circuit 327.

The external data reception circuit 321 may include the same number of reception buffers as the number of terminals to which the data DQ<k:k+3> are input. In FIG. 3, because four data terminals are provided for each memory package 120 (FIG. 2), the external data reception circuit 321 may include four reception buffers. Buffers of the external data reception circuit 321 may receive the data DQ<k:k+3> by comparing voltage levels of the data reference voltage VREFDQ and the data DQ<k:k+3> with each other.

The external data strobe reception circuit 325 may receive the data strobe signals DQS_t and DQS_c transmitted from the memory interface 115 (FIG. 1), together with the data DQ<k:k+3>. Because the data strobe signals DQS_t and DQS_c are differential-type signals, the external data strobe reception circuit 325 may include a reception buffer that compares voltage levels of a data strobe signal DQS_t and a data strobe bar signal DQS_c with each other and receives them.

The external data transmission circuit 323 may transmit the data DQ<k:k+3>. The external data transmission circuit 323 may include four transmission drivers.

The external data strobe transmission circuit 327 may transmit the data strobe signals DQS_t and DQS_c for strobing the data DQ<k:k+3> transmitted by the external data transmission circuit 323. The external data strobe transmission circuit 327 may include two transmission drivers.

The clock reception circuit 390 may receive clocks CLK_t and CLK_c transmitted from the memory interface 115 (FIG. 1). Because the clocks CLK_t and CLK_c are differential-type signals, the clock reception circuit 390 may include a reception buffer that compares voltage levels of the clock CLK_t and the clock bar CLK_c, and receives them.

The clock divider 393 may divide the clocks CLK_t and CLK_c received through the clock reception circuit 390. First to fourth clocks ICLK, QCLK, BCLK, and QBCLK generated by the clock divider 393 may each have a frequency of half the frequency of each of the clocks CLK_t and CLK_c, and may have different phases. The clocks CLK_t and CLK_c received through the clock reception circuit 390 and the first to fourth clocks ICLK, QCLK, BCLK, and QBCLK generated by the clock divider 393 may be used by various components inside the buffer chip 220.

The control signal transmission circuit 350 may buffer the control signals received through the external control signal interface 310, and transmit the buffered control signals to the internal control signal interface 330. The control signal transmission circuit 350 may include a setup and hold latch circuit 351 for securing a setup hold margin and a transmission control circuit 353 performing a buffering operation.

The internal control signal interface 330 may transmit control signals M_CS<0:3> and M_CA<0:13> transmitted through the control signal transmission circuit 350 to the memory chips 231 to 234 (FIG. 2). The command address signals M_CA<0:13> may be transmitted in common to the memory chips 231 to 234 (FIG. 2), and the chip select signals M_CS<0:3> may be transmitted to the memory chips 231 to 234 (FIG. 2) in a one-to-one manner. That is, the chip select signal M_CS<0> may be transmitted to the memory chip 231 (FIG. 2), the chip select signal M_CS<1> may be transmitted to the memory chip 232 (FIG. 2), the chip select signal M_CS<2> may be transmitted to the memory chip 233 (FIG. 2), and the chip select signal M_CS<3> may be transmitted to the memory chip 234 (FIG. 2).

The internal control signal interface 330 may include a chip select signal transmission circuit 331 and a command address transmission circuit 335. Because the number of chip select signals M_CS<0:3> is 4, the chip select signal transmission circuit 331 may include four transmission drivers. Also, because the number of command address signals M_CA<0:13> is 14, the command address transmission circuit 335 may include 14 transmission drivers.

The internal data interface 340 may transmit/receive data M_DQ<k:k+3> to/from the memory chips 231 to 234 (FIG. 2). The data M_DQ<k:k+3> may be connected in common to the memory chips 231 to 234 (FIG. 2). When the data M_DQ<k:k+3> are transmitted in common to the memory chips 231 to 234 (FIG. 2) during a write operation, a memory chip selected to perform a write operation among the memory chips 231 to 234 (FIG. 2) may receive the data M_DQ<k:k+3> transmitted by the internal data interface 340. During a read operation, a memory chip selected to perform a read operation among the memory chips 231 to 234 may transmit the data M_DQ<k:k+3> to the internal data interface 340. The internal data interface 340 may transmit/receive not only the data M_DQ<k:k+3> but also the data strobe signals M_DQS_t and M_DQS_c for strobing the data M_DQ<k:k+3> to/from the memory chips 231 to 234 (FIG. 2).

The internal data interface 340 may include an internal data transmission circuit 341, an internal data reception circuit 343, an internal data strobe transmission circuit 345, and an internal data strobe reception circuit 347. The internal data transmission circuit 341 may include four transmission drivers, and the internal data reception circuit 343 may include four reception buffers. The internal data strobe transmission circuit 345 may include two transmission drivers, and the internal data strobe reception circuit 347 may include one reception buffer.

The clock transmission circuit 395 may transmit the clocks M_CLK_t and M_CLK_c to the memory chips 231 to 234 (FIG. 2). The clocks M_CLK_t and M_CLK_c may be transmitted in common to the memory chips 231 to 234 (FIG. 2). The clock transmission circuit 395 may include two transmission drivers.

The command decoder 370 may decode the chip select signals CS<0:3> and the command address signals CA<0:13> received through the external control signal interface 310. The command decoder 370 may receive and decode control signals latched by the setup and hold latch circuit 351 after being received through the external control signal interface 310. The chip select signals CS<0:3> indicate the validity of the command address signals CA<0:13>, and when even one of the four chip select signals CS<0:3> is activated to a low level, the command decoder 370 of the buffer chip 220 may determine that the command address signals CA<0:13> are valid and decode the command address signals CA<0:13>.

The setting circuit 380 may perform a setting operation according to the decoding result of the command decoder 370. Setting items of the setting circuit 380 may include a read latency of the buffer chip 220, a write latency of the buffer chip 220, levels of reference voltages used by the buffer chip 220, a termination resistance value (also referred to as Rtt) of the buffers included in the buffer chip 220, a termination resistance value (also referred to as Ron) of the drivers included in the buffer chip 220, and the like.

The latency control circuit 360 may control whether to activate the external data interface 320 and the internal data interface 340. The latency control circuit 360 may activate the external data reception circuit 321 and the internal data transmission circuit 341 so that the data DQ<k:k+3> transmitted from the memory interface 115 (FIG. 1) to the buffer chip 220 may be received after a write latency set by the setting circuit 380 from the time point when a write command is applied to the buffer chip 220 and transmitted to the memory chips 231 to 234 (FIG. 2). The latency control circuit 360 may further activate the internal data reception circuit 343 and the external data transmission circuit 323 so that data DQ<k:k+3>, received from the memory chips 231 to 234 (FIG. 2) and then buffered, may be transmitted from the buffer chip 220 to the memory interface 115 (FIG. 1) after a read latency set by the setting circuit 380 from a time point when a read command is applied to the buffer chip 220. The latency control circuit 360 may activate the external data strobe reception circuit 325 and the internal data strobe transmission circuit 345 during the write operation and activate the internal data strobe reception circuit 347 and the external data strobe transmission circuit 327 during the read operation so that the data strobe signals DQS_t and DQS_c may also be transmitted and received together with the data DQ<k:k+3>. The latency control circuit 360 may receive information indicating that the read command and the write command have been applied to the buffer chip 220 from the command decoder 370, and receive information related to the read latency and the write latency from the setting circuit 380.

Figure 4:
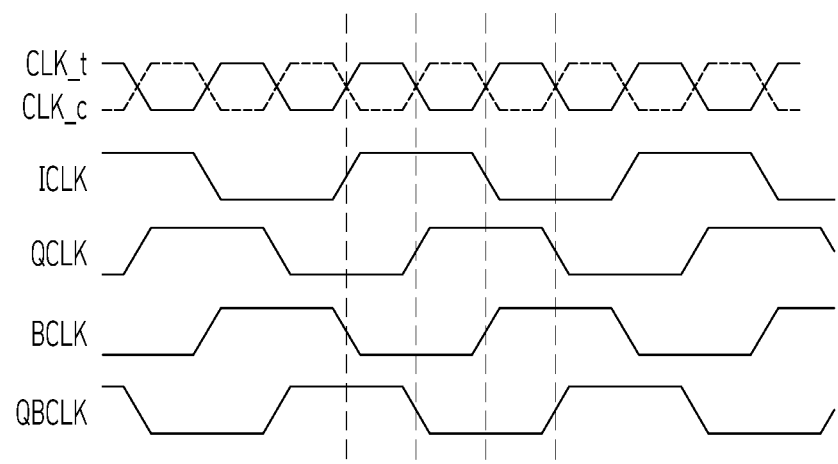
FIG. 4 is a timing diagram illustrating wave forms of first to fourth clocks generated by a clock divider shown in FIG. 3 in accordance with an embodiment of the present disclosure.

FIG. 4 is a timing diagram illustrating wave forms of the first to fourth clocks ICLK, QCLK, BCLK, and QBCLK generated by the clock divider 393 shown in FIG. 3 in accordance with an embodiment of the present disclosure.

Referring to FIG. 4, the first to fourth clocks ICLK, QCLK, BCLK, and QBCLK generated by the clock divider 393 may each have a frequency of half the frequency of each of the clocks CLK_t and CLK_c, and may have a phase difference of 90° among the first to fourth clocks ICLK, QCLK, BCLK, and QBCLK.

Figure 5:
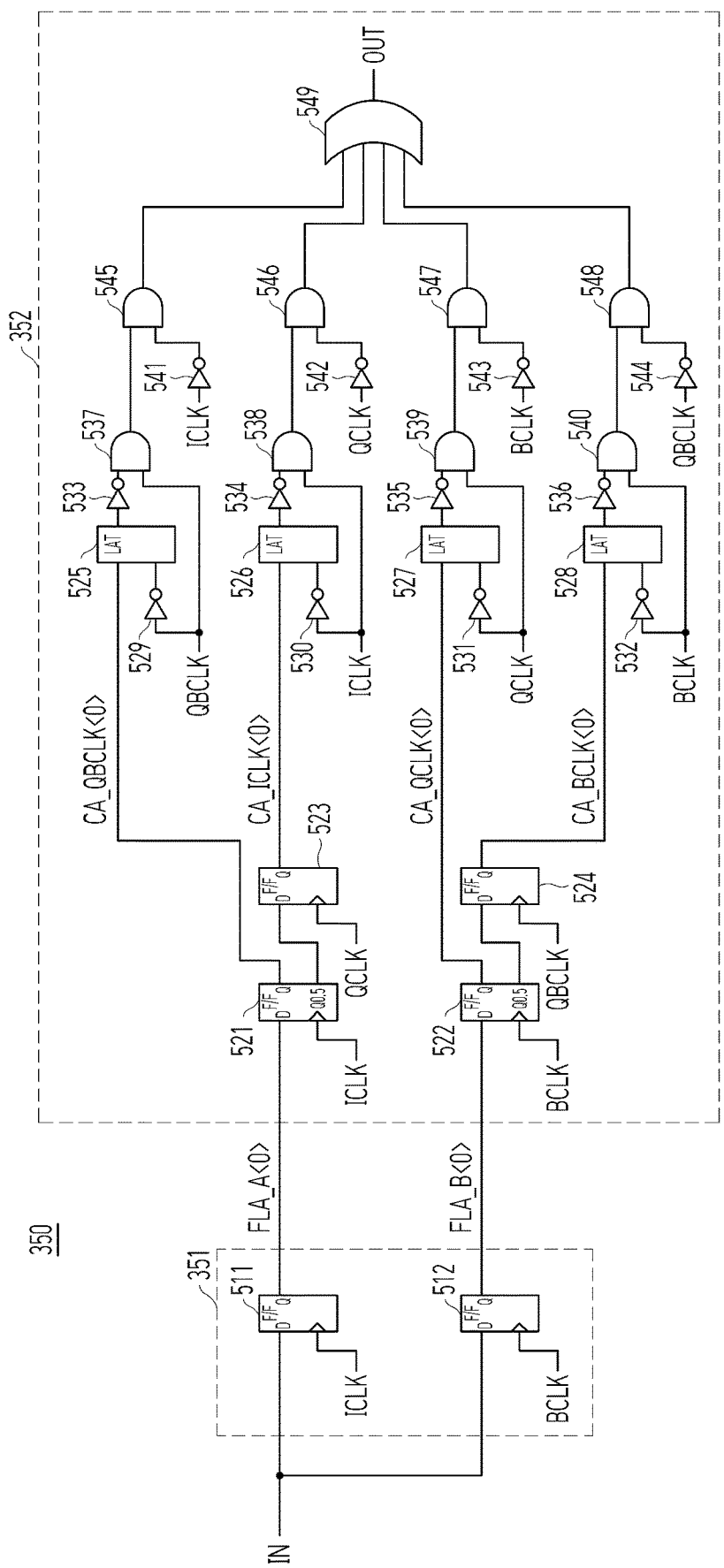
FIG. 5 is a diagram illustrating a detailed configuration of a control signal transmission circuit shown in FIG. 3 in accordance with an embodiment of the present disclosure.
Figure 6:
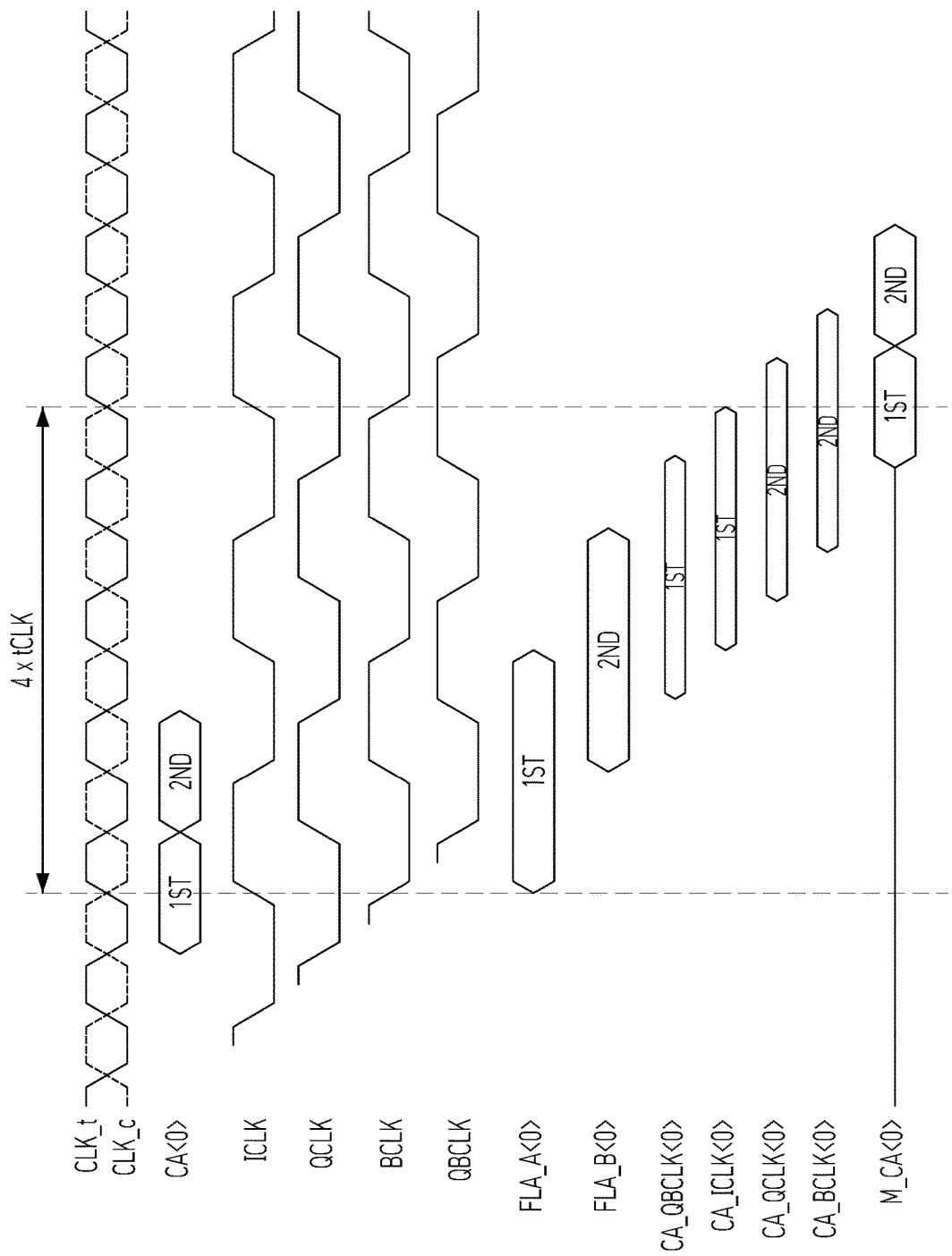
FIG. 6 is a timing diagram illustrating an operation of the control signal transmission circuit shown in FIG. 5 in accordance with an embodiment of the present disclosure.

FIG. 5 is a diagram illustrating a detailed configuration of the control signal transmission circuit 350 shown in FIG. 3, and FIG. 6 is a timing diagram illustrating an operation of the control signal transmission circuit 350 in accordance with an embodiment of the present disclosure. FIG. 5 illustrates components for transmitting the command address signal CA<0> in the control signal transmission circuit 350. The remaining control signals CA<1:13> and CS<0:3> may also be transmitted in the same way as the command address signal CA<0>.

Referring to FIG. 5, the setup and hold latch circuit 351 of the control signal transmission circuit 350 may include D flip-flops 511 and 512. An input IN of the D flip-flops 511 and 512 may be an output of a buffer of the command address reception circuit 315 in FIG. 3, which receives the command address signal CA<0>. The D flip-flop 511 may receive an input at a rising edge of a first clock ICLK, latch the received input, and output a signal FLA_A<0>, and the D flip-flop 512 may receive an input at a rising edge of a third clock BCLK, latch the received input, and output a signal FLA_B<0>. Referring to FIG. 6 together, a signal 1ST of a first cycle of the command address signal CA<0> may be latched by the D flip-flop 511 and output as the signal FLA_A<0>, and a signal 2ND of a second cycle of the command address signal CA<0> may be latched by the D flip-flop 512 and output as the signal FLA_B<0>.

The transmission control circuit 352 of the control signal transmission circuit 350 may include D flip-flops 521 to 524, D latches 525 to 528, inverters 529 to 536 and 541 to 544, AND gates 537 to 540 and 545 to 548, and an OR gate 549.

Figure 7:
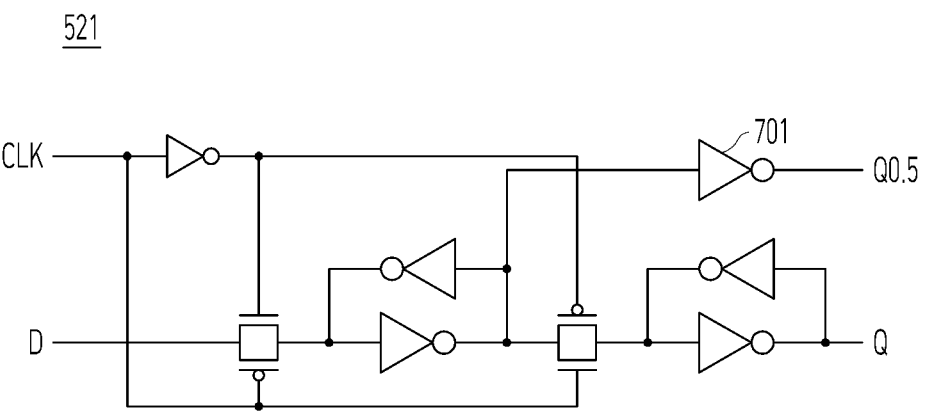
FIG. 7 is a diagram illustrating a detailed configuration of a D flip-flop shown in FIG. 5 in accordance with an embodiment of the present disclosure.

The D flip-flop 521 may receive and latch the signal FLA_A<0> at the rising edge of the first clock ICLK. A signal output as an output Q of the D flip-flop 521 is instructed by CA_QBCLK<0>. An output Q0.5 of the D flip-flop 521 may be an output of a first stage of the D flip-flop 521 including two stages. FIG. 7 illustrates the detailed configuration of the D flip-flop 521, and the D flip-flop 521 may further include an inverter 701 for outputting the output Q0.5 from a latch of the first stage in addition to the configuration of a general D flip-flop. The D flip-flop 523 may receive and latch the output Q0.5 of the D flip-flop 521 at a rising edge of the second clock QCLK, and output the latched output as a signal CA_ICLK<0>. Referring to FIG. 6, the signals CA_QBCLK<0> and CA_ICLK<0> may have a phase difference equal to a phase difference between the first clock ICLK and the second clock QCLK.

The D flip-flop 522 may receive and latch the signal FLA_B<0> at the rising edge of the third clock BCLK. A signal output as an output Q of the D flip-flop 522 is instructed by CA_QCLK<0>. The D flip-flop 524 may receive and latch an output Q0.5 of the D flip-flop 522 at a rising edge of the fourth clock QBCLK, and output the latched output as a signal CA_BCLK<0>. Referring to FIG. 6, the signals CA_QCLK<0> and CA_BCLK<0> may have a phase difference equal to a phase difference between the third clock BCLK and the fourth clock QBCLK.

The D latch 525 may latch and output the signal CA_QBCLK<0> while the fourth clock QBCLK is at a low level, an output of the D latch 525 may be inverted by the inverter 533, and an output of the inverter 533 and the fourth clock QBCLK may be input to the AND gate 537. An output of the AND gate 537 may be input to the AND gate 545 together with the first clock ICLK inverted by the inverter 541.

The D latch 526 may latch and output the signal CA_ICLK<0> while the first clock ICLK is at a low level, an output of the D latch 526 may be inverted by the inverter 534, and an output of the inverter 534 and the first clock ICLK may be input to the AND gate 538. An output of the AND gate 538 may be input to the AND gate 546 together with the second clock QCLK inverted by the inverter 542.

The D latch 527 may latch and output the signal CA_QCLK<0> while the second clock QCLK is at a low level, an output of the D latch 527 may be inverted by the inverter 535, and an output of the inverter 535 and the second clock QCLK may be input to the AND gate 539. An output of the AND gate 539 may be input to the AND gate 547 together with the third clock BCLK inverted by the inverter 543.

The D latch 528 may latch and output the signal CA_BCLK<0> while the third clock BCLK is at a low level, an output of the D latch 528 may be inverted by the inverter 536, and an output of the inverter 536 and the third clock BCLK may be input to the AND gate 540. An output of the AND gate 540 may be input to the AND gate 548 together with the fourth clock QBCLK inverted by the inverter 544.

Outputs of the AND gates 545 to 548 may be input to the OR gate 549, and an output OUT of the OR gate 549 may be an input of a driver of the command address transmission circuit 335 in FIG. 3, which transmits the command address signal M_CA<0>.

Referring to FIG. 6, the command address signal CA<0> received from the memory interface 115 (FIG. 1) by the command address reception circuit 315 of the buffer chip 220 may be buffered by the control signal transmission circuit 350, delayed by 4 clock cycles based on the clocks CLK_t and CLK_c, and transmitted to the memory chips 231 to 234 (FIG. 2) by the command address transmission circuit 335.

Referring now back to FIGS. 1 to 3, the buffer chip 220 in FIG. 3 includes one command decoder 370 and one setting circuit 380. The command decoder 370 does not distinguish the chip select signals CS<0:3>, and determines that the command address signals CA<0:13> are valid when any one of the chip select signals CS<0:3> is activated to a low level. When the memory controllers 113 and 115 of the module controller 110 set different values for each of the memory chips 231 to 234 distinguished by the chip select signals CS<0:3>, that is, for each of ranks, within the memory package 120, the operations of the buffer chip 220 and the memory package 120 may be problematic.

Figure 8:
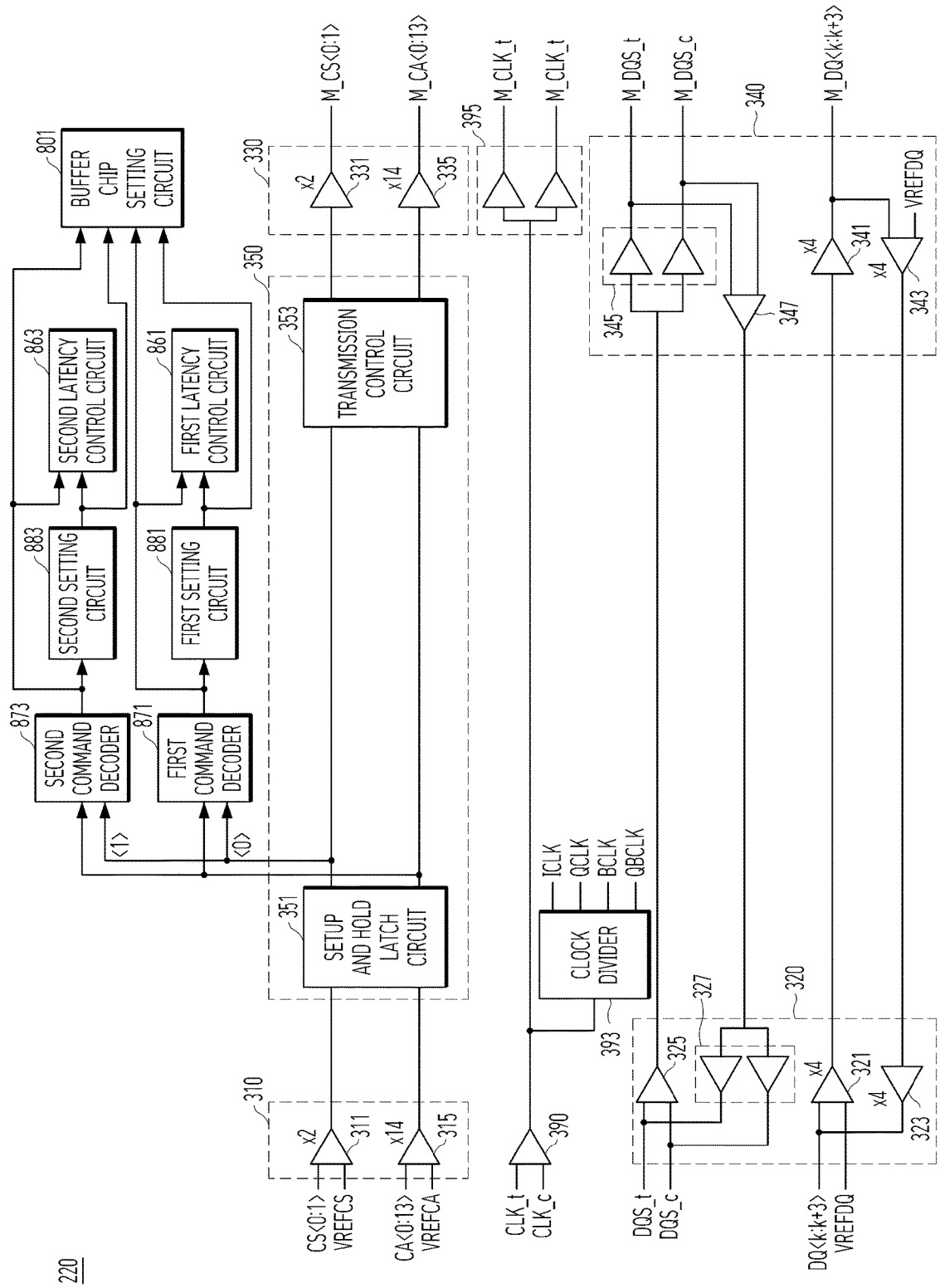
FIG. 8 is a diagram illustrating a detailed configuration of the buffer chip shown in FIG. 2 in accordance with an embodiment of the present disclosure.

FIG. 8 is a diagram illustrating a detailed configuration of the buffer chip 220 shown in FIG. 2 in accordance with an embodiment of the present disclosure. With reference to FIG. 8, an embodiment in which the buffer chip 220 separately performs a setting operation for each rank will be described. Hereinafter, for the convenience of description, the number of chip select signals CS<0:1> is two, that is, the number of memory chips 231 and 232 (FIG. 2) included in the memory package 120 (FIG. 2) is two, which indicates that the memory package 120 is configured by two ranks, however other numbers of memory chips may be used.

Referring to FIG. 8, the buffer chip 220 may include the external control signal interface 310, the external data interface 320, the internal control signal interface 330, the internal data interface 340, the control signal transmission circuit 350, a first latency control circuit 861, a second latency control circuit 863, a first command decoder 871, a second command decoder 873, a first setting circuit 881, a second setting circuit 883, a clock reception circuit 390, a clock divider 393, a clock transmission circuit 395, and a buffer chip setting circuit 801.

The first command decoder 871 may decode the chip select signal CS<0> and the command address signals CA<0:13> received through the external control signal interface 310. Specifically, when the chip select signal CS<0> is activated to a low level, the first command decoder 871 may decode the command address signals CA<0:13>. That is, the first command decoder 871 may decode a command of rank 0.

The second command decoder 873 may decode the chip select signal CS<1> and the command address signals CA<0:13> received through the external control signal interface 310. Specifically, when the chip select signal CS<1> is activated to a low level, the second command decoder 873 may decode the command address signals CA<0:13>. That is, the second command decoder 873 may decode a command of rank 1.

The first setting circuit 881 may store setting values corresponding to the rank 0, that is, corresponding to the memory chip 231 (FIG. 2), according to the decoding result of the first command decoder 871. The setting values may include the read latency and write latency for a buffering operation for the memory chip 231 of the buffer chip 220, levels of reference voltages (for example, VREFCA, VREFCS, and VREFDQ) used during the buffering operation for the memory chip 231 of the buffer chip 220, termination resistance values of buffers used by the buffer chip 220 during the buffering operation for the memory chip 231, termination resistance values of drivers used by the buffer chip 220 during the buffering operation for the memory chip 231, and the like.

The second setting circuit 883 may store setting values corresponding to the rank 1, that is, corresponding to the memory chip 233 (FIG. 2), according to the decoding result of the second command decoder 873. The setting values may include the read latency and write latency for a buffering operation for the memory chip 232 of the buffer chip 220, levels of reference voltages used during the buffering operation for the memory chip 232 of the buffer chip 220, termination resistance values of buffers used by the buffer chip 220 during the buffering operation for the memory chip 232, termination resistance values of drivers used by the buffer chip 220 during the buffering operation for the memory chip 232, and the like.

Some of the setting values stored in the first setting circuit 881 and the second setting circuit 883 may be immediately applied once they are stored in the setting circuits 881 and 883. For example, when the setting values such as the read latency and the write latency are stored in the first setting circuit 881, the setting values may be immediately applied as the latency setting values of the rank 0, and when the setting values such as the read latency and the write latency are stored in the second setting circuit 883, the setting values may be immediately applied as the latency setting values of the rank 1. Hereinafter, setting values that are immediately applied once they are stored in the setting circuits 881 and 883 will be referred to as immediate setting values.

Some of the setting values stored in the first setting circuit 881 and the second setting circuit 883 may be applied not at a time point when they are stored in the setting circuits 881 and 883, but at a time point when application of the setting values is instructed. For example, the setting values of the levels of the reference voltages and the termination resis- tance values stored in the first setting circuit 881 may be applied not at a time point when they are stored in the first setting circuit 881, but at a time point when application of the setting values of the rank 0 is instructed. Likewise, the setting values of the levels of the reference voltages and the termination resistance values stored in the second setting circuit 883 may be applied not at a time point when they are stored in the second setting circuit 883, but at a time point when application of the setting values of the rank 1 is instructed. Hereinafter, setting values applied at a time point when application of the setting values is instructed will be referred to as instruction setting values.

The buffer chip setting circuit 801 may be a circuit for storing instruction setting values to which setting value application is instructed. When application of the setting value of the rank 0, that is, the memory chip 231, is instructed, the instruction setting values stored in the first setting circuit 881 may be applied to and stored in the buffer chip setting circuit 801. The instruction setting values of the rank 0 may be applied to the buffer chip 220 at a time point when they are stored in the buffer chip setting circuit 801. For example, the levels of the reference voltages and the termination resistance values used by the buffer chip 220 may be set (i.e., stored) as the instruction setting values of the rank 0 stored in the buffer chip setting circuit 801. When application of the setting value of the rank 1, that is, the memory chip 232, is instructed, the instruction setting values stored in the second setting circuit 883 may be applied to and stored in the buffer chip setting circuit 801. The instruction setting values of the rank 1 may be applied to the buffer chip 220 at a time point when they are stored in the buffer chip setting circuit 801. For example, the levels of the reference voltages and the termination resistance values used by the buffer chip 220 may be set (i.e., stored) as the instruction setting values of the rank 1 stored in the buffer chip setting circuit 801.

The first latency control circuit 861 may control whether to activate the external data interface 320 and the internal data interface 340. The first latency control circuit 861 may activate the external data reception circuit 321 and the internal data transmission circuit 341 so that the data DQ<k: k+3> transmitted from the memory interface 115 (FIG. 1) to the buffer chip 220 may be received after a write latency set by the first setting circuit 881 from the time point when a write command corresponding to the rank 0 is applied to the buffer chip 220 and transmitted to the memory chip 231 of the rank 0. The first latency control circuit 861 may further activate the internal data reception circuit 343 and the external data transmission circuit 323 so that data DQ<k: k+3>, received from the memory chip 231 and then buffered, may be transmitted from the buffer chip 220 to the memory interface 115 (FIG. 1) after a read latency set by the first setting circuit 881 from a time point when a read command corresponding to the rank 0 is applied to the buffer chip 220. The first latency control circuit 861 may activate the external data strobe reception circuit 325 and the internal data strobe transmission circuit 345 during the write operation of the rank 0 and activate the internal data strobe reception circuit 347 and the external data strobe transmission circuit 327 during the read operation of the rank 0 so that the data strobe signals DQS_t and DQS_c may also be transmitted and received together with the data DQ<k:k+3>. The first latency control circuit 861 may receive information indicat- ing that the read command and the write command of the rank 0 have been applied to the buffer chip 220 from the first command decoder 871, and receive information related to the read latency and the write latency of the rank 0 from the first setting circuit 881.

The second latency control circuit 863 may control whether to activate the external data interface 320 and the internal data interface 340. The second latency control circuit 863 may activate the external data reception circuit 321 and the internal data transmission circuit 341 so that the data DQ<k:k+3> transmitted from the memory interface 115 (FIG. 1) to the buffer chip 220 may be received after a write latency set by the second setting circuit 883 from the time point when a write command corresponding to the rank 1 is applied to the buffer chip 220 and transmitted to the memory chip 232 of the rank 1. The second latency control circuit 863 may further activate the internal data reception circuit 343 and the external data transmission circuit 323 so that data DQ<k:k+3>, received from the memory chip 232 and then buffered, may be transmitted from the buffer chip 220 to the memory interface 115 (FIG. 1) after a read latency set by the second setting circuit 883 from a time point when a read command corresponding to the rank 1 is applied to the buffer chip 220. The second latency control circuit 863 may activate the external data strobe reception circuit 325 and the internal data strobe transmission circuit 345 during the write operation of the rank 1 and activate the internal data strobe reception circuit 347 and the external data strobe transmission circuit 327 during the read operation of the rank 1 so that the data strobe signals DQS_t and DQS_c may also be transmitted and received together with the data DQ<k:k+3>. The second latency control circuit 863 may receive information indicating that the read command and the write command of the rank 1 have been applied to the buffer chip 220 from the second command decoder 873, and receive information related to the read latency and the write latency of the rank 1 from the second setting circuit 883.

Figure 9:
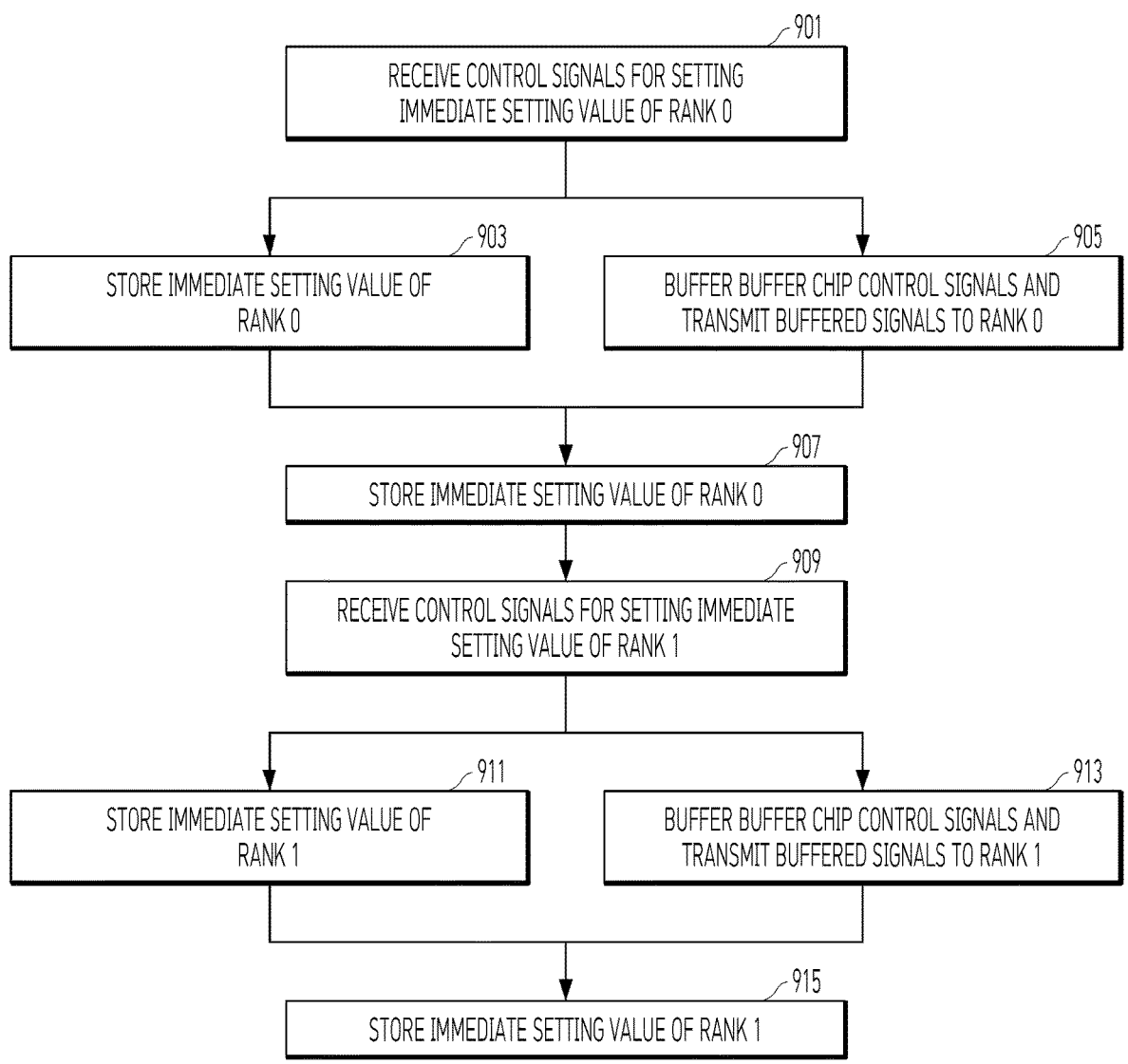
FIG. 9 is a flowchart illustrating an operation in which immediate setting values are set in the memory package including the buffer chip shown in FIG. 8 in accordance with an embodiment of the present disclosure.

FIG. 9 is a flowchart illustrating an operation in which immediate setting values are set in the memory package 120 including the buffer chip 220 shown in FIG. 8 in accordance with an embodiment of the present disclosure.

Referring to FIG. 9, the external control signal interface 310 of the buffer chip 220 may receive control signals CS<0> and CA<0:13> for setting an immediate setting value of the rank 0 (at operation 901). The control signals for setting the immediate setting value of the rank 0 may include the chip select signal CS<0> and the command address signals CA<0:13>.

The first command decoder 871 of the buffer chip 220 may decode the chip select signal CS<0> and the command address signals CA<0:13>, and as a result, the first setting circuit 881 may store the immediate setting value (at operation 903). For example, the read latency RL of the rank 0 may be stored in the first setting circuit 881. The immediate setting value may be immediately applied as a setting value once it is stored in the first setting circuit 881.

Subsequently, the buffer chip 220 may buffer the control signals CS<0> and CA<0:13> received in the operation 901 and transmit the buffered signals to the memory chip 231 (at operation 905). The memory chip 231 may decode the control signals M_CS<0> and M_CA<0:13>, and as a result, an immediate setting value (for example, read latency) of the memory chip 231 may be set (i.e., stored) (at operation 907).

The external control signal interface 310 of the buffer chip 220 may receive the control signals CS<1> and CA<0:13> for setting the immediate setting value of the rank 1 (at operation 909). The control signals for setting the immediate setting value of the rank 1 may include the chip select signal CS<1> and the command address signals CA<0:13>.

The second command decoder 873 of the buffer chip 220 may decode the chip select signal CS<1> and the command address signals CA<0:13>, and as a result, the second setting circuit 883 may store the immediate setting value (at operation 911). For example, the write latency WL of the rank 1 may be stored in the second setting circuit 883. The immediate setting value may be immediately applied as a setting value once it is stored in the second setting circuit 883.

Subsequently, the buffer chip 220 may buffer the control signals CS<1> and CA<0:13> received in the operation 909 and transmit the buffered signals to the memory chip 232 (at operation 913). The memory chip 232 may decode the control signals M_CS<1> and M_CA<0:13>, and as a result, an immediate setting value of the memory chip 232 may be set (i.e., stored) (at operation 915).

As seen from FIG. 9, when the buffer chip 220 receives the control signals CS<0> and CA<0:13> for setting the immediate setting value of the rank 0, the immediate setting value of the rank 0 of the buffer chip 220 may be set, and when the memory chip 231 of the rank 0 receives the buffered control signals M_CS<0> and M_CA<0:13> through the buffer chip 220, the immediate setting value of the memory chip 231 may be set. Furthermore, when the buffer chip 220 receives the control signals CS<1> and CA<0:13> for setting the immediate setting value of the rank 1, the immediate setting value of the rank 1 of the buffer chip 220 may be set, and when the memory chip 232 of the rank 1 receives the buffered control signals M_CS<1> and M_CA<0:13> through the buffer chip 220, the immediate setting value of the memory chip 232 may be set.

Figure 10:
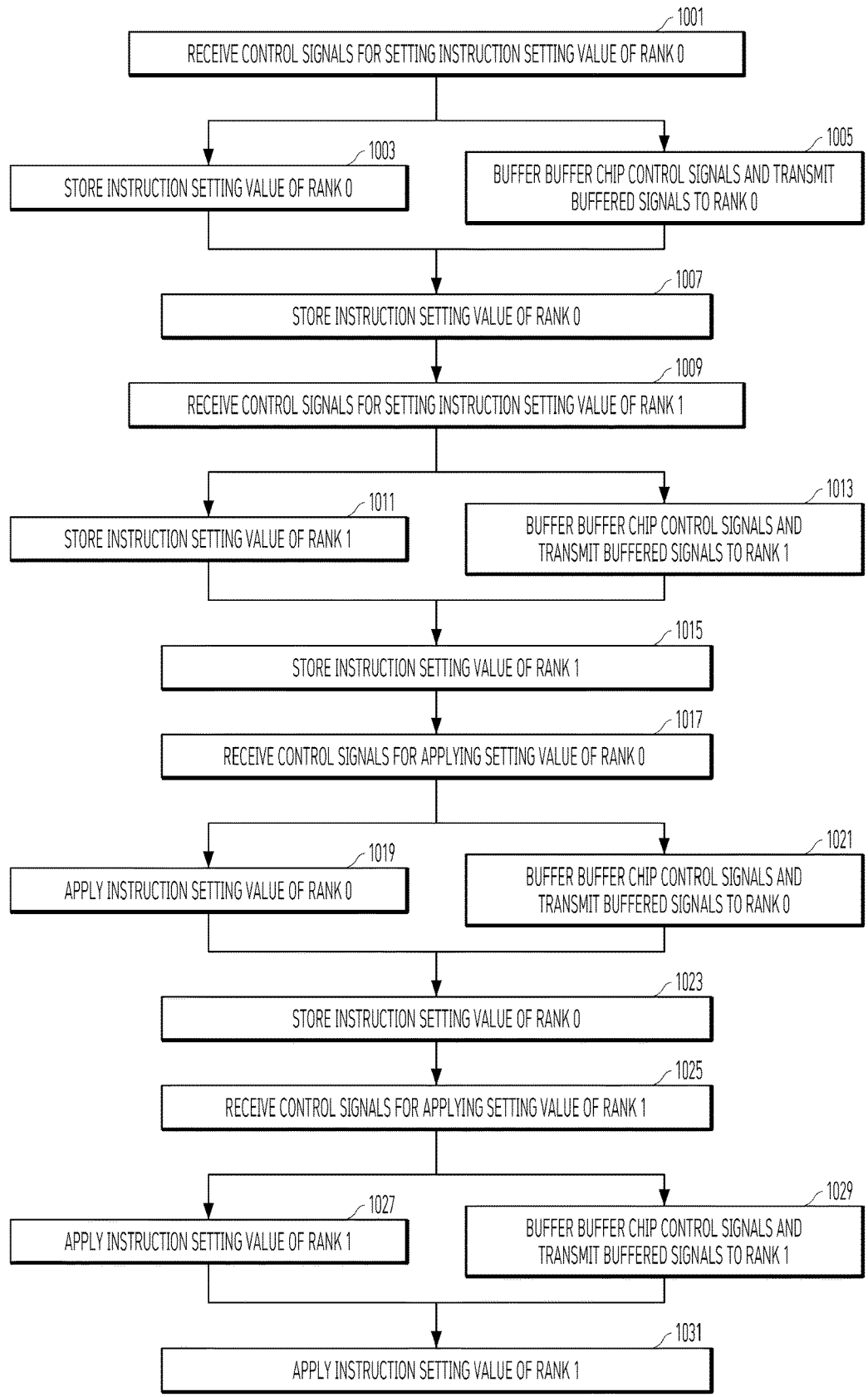
FIG. 10 is a flowchart illustrating an operation in which instruction setting values are set in the memory package including the buffer chip shown in FIG. 8 in accordance with an embodiment of the present disclosure.

FIG. 10 is a flowchart illustrating an operation in which instruction setting values are set in the memory package 120 including the buffer chip 220 shown in FIG. 8 in accordance with an embodiment of the present disclosure.

Referring to FIG. 10, the external control signal interface 310 of the buffer chip 220 may receive control signals CS<0> and CA<0:13> for setting the instruction setting value of the rank 0 (at operation 1001). The control signals for setting the instruction setting value of the rank 0 may include the chip select signal CS<0> and the command address signals CA<0:13>.

The first command decoder 871 of the buffer chip 220 may decode the chip select signal CS<0> and the command address signals CA<0:13>, and as a result, the first setting circuit 881 may store the instruction setting value (at operation 1003). For example, the value of the reference voltage VREF_CS of the rank 0 may be stored. In such a case, the instruction setting value is stored only in the first setting circuit 881 and might not yet be applied.

Subsequently, the buffer chip 220 may buffer the control signals CS<0> and CA<0:13> received in the operation 1001 and transmit the buffered signals to the memory chip 231 (at operation 1005). The memory chip 231 may decode the control signals M_CS<1> and M_CA<0:13>, and as a result, the instruction setting value (for example, the value of VREF_CS) of the memory chip 231 may be stored (at operation 1007). In such a case, the instruction setting value is stored only in the memory chip 231 and might not yet be applied.

The external control signal interface 310 of the buffer chip 220 may receive the control signals CS<1> and CA<0:13> for setting the instruction setting value of the rank 1 (at operation 1009). The control signals for setting the instruction setting value of the rank 1 may include the chip select signal CS<1> and the command address signals CA<0:13>.

The second command decoder 873 of the buffer chip 220 may decode the chip select signal CS<1> and the command address signals CA<0:13>, and as a result, the second setting circuit 883 may store the instruction setting value (at operation 1011). For example, the value of the reference voltage VREF_CS of the rank 1 may be stored. In such a case, the instruction setting value is stored only in the second setting circuit 883 and might not yet be applied.

Subsequently, the buffer chip 220 may buffer the control signals CS<1> and CA<0:13> received in the operation 1009 and transmit the buffered signals to the memory chip 232 (at operation 1013). As a result, the instruction setting value of the memory chip 232 may be stored (at operation 1015). In such a case, the instruction setting value is stored only in the memory chip 232 and might not yet be applied.

The external control interface 310 of the buffer chip 220 may receive the control signals CS<0> and CA<0:13> for applying the setting value of the rank 0 (at operation 1017).

The first command decoder 871 of the buffer chip 220 may decode the chip select signal CS<0> and the command address signals and ascertain that setting value application of the rank 0 has been instructed. Under the control of the first command decoder 871, the instruction setting value stored in the first setting circuit 881 may be applied to and stored in the buffer chip setting circuit 801 (at operation 1019). When the instruction setting value is stored in the buffer chip setting circuit 801, the setting value may be applied as a setting value of the buffer chip 220. For example, when the value of the reference voltage VREF_CS of the rank 0 is stored in the buffer chip setting circuit 801, the buffer chip 220 uses the reference voltage VREF_CS of the rank 0 as a reference voltage for receiving the chip select signals CS<0:1>.

Subsequently, the buffer chip 220 may buffer the control signals CS<0> and CA<0:13> received in the operation 1017 and transmit the buffered signals to the memory chip 231 (at operation 1021). As a result, the memory chip 231 may apply the instruction setting value stored in the operation 1015 as a setting value of the memory chip 231 (at operation 1023). For example, the memory chip 231 may apply the value of the reference voltage VREF_CS stored in the operation 1015, to the level of the reference voltage VREF_CS used by the memory chip 231.

The external control interface 310 of the buffer chip 220 may receive the control signals CS<1> and CA<0:13> for applying the setting value of the rank 1 (at operation 1025).

The second command decoder 873 of the buffer chip 220 may decode the chip select signal CS<1> and the command address signals CA<0:13> and ascertain that setting value application of the rank 1 has been instructed. Under the control of the second command decoder 873, the instruction setting value stored in the second setting circuit 883 may be applied to and stored in the buffer chip setting circuit 801 (at operation 1027). The instruction setting value of the first setting circuit 881 stored in the operation 1019 may be replaced with the instruction setting value of the second setting circuit 883. When the instruction setting value of the rank 1 stored in the second setting circuit 883 is stored in the buffer chip setting circuit 801, the setting value may be applied as the setting value of the buffer chip 220. For example, when the value of the reference voltage VREF_CS of the rank 1 is stored in the buffer chip setting circuit 801, the buffer chip 220 uses the reference voltage VREF_CS of the rank 1 as the reference voltage for receiving the chip select signals CS<0:1>.

Subsequently, the buffer chip 220 may buffer the control signals CS<1> and CA<0:13> received in the operation 1025 and transmit the buffered signals to the memory chip 232 (at operation 1029). As a result, the memory chip 232 may apply the instruction setting value stored in the operation 1015 as a setting value of the memory chip 232 (at operation 1031). For example, the memory chip 232 may apply the value of the reference voltage VREF_CS stored in the operation 1025, to the level of the reference voltage VREF_CS used by the memory chip 232.

As seen from FIG. 10, when the buffer chip 220 receives the control signals CS<0> and CA<0:13> for setting the instruction setting value of the rank 0, the instruction setting value of the rank 0 may be stored in the buffer chip 220, and when the memory chip 231 of the rank 0 receives the buffered control signals M_CS<0> and M_CA<0:13> through the buffer chip 220, the memory chip 231 may store the instruction setting value. Furthermore, when the buffer chip 220 receives the control signals CS<1> and CA<0:13> for setting the instruction setting value of the rank 1, the instruction setting value of the rank 1 may be stored in the buffer chip 220, and when the memory chip 232 of the rank 1 receives the buffered control signals M_CS<1> and M_CA<0:13> through the buffer chip 220, the memory chip 232 may store the instruction setting value. Subsequently, when application of the instruction setting value of the rank 0 is instructed, the instruction setting value of the rank 0 may be applied to the buffer chip 220 and the memory chip 231, and when application of the instruction setting value of the rank 1 is instructed, the instruction setting value of the rank 1 may be applied to the buffer chip 220 and the memory chip 232.

Although embodiments according to the technical aspects of the present disclosure have been described above with reference to the accompanying drawings, this is only for describing the embodiments according to the concept of the present disclosure, and the present disclosure is not limited to the above embodiments. Various types of substitutions, modifications, and changes for the embodiments may be made by those skilled in the art, to which the present disclosure pertains, without departing from the technical aspects of the present disclosure defined in the following claims, and it should be construed that these substitutions, modifications, and changes belong to the scope of the present disclosure. Furthermore, the embodiments may be combined to form additional embodiments.

What is claimed is:

1. An operation method of a buffer chip, the operation method comprising:
    receiving first control signals for setting a first memory chip;
    buffering the first control signals and transmitting the buffered first control signals to the first memory chip;
    storing a setting value for the first memory chip in response to the first control signals;
    receiving second control signals for setting a second memory chip;
    buffering the second control signals and transmitting the buffered second control signals to the second memory chip;
    storing a setting value for the second memory chip in response to the second control signals;
    receiving third control signals for applying the setting value for the first memory chip;
    buffering the third control signals and transmitting the buffered third control signals to the first memory chip; and
    applying the stored setting value for the first memory chip as a setting value of the buffer chip in response to the third control signals.

2. The operation method of claim 1, further comprising:
    receiving fourth control signals for applying the setting value for the second memory chip;

buffering the fourth control signals and transmitting the buffered fourth control signals to the second memory chip; and applying the stored setting value for the second memory chip as the setting value of the buffer chip in response to the fourth control signals.

3. The operation method of claim 1, wherein the setting value includes at least one of a level of a reference voltage and a termination resistance value.

4. An operation method of a semiconductor package, the operation method comprising:

receiving, by a buffer chip, first control signals for setting a first memory chip;

buffering, by the buffer chip, the first control signals and transmitting the buffered first control signals to the first memory chip;

storing, by the buffer chip, a setting value for the first memory chip in response to the first control signals;

storing, by the first memory chip, the setting value for the first memory chip in response to the first control signals;

receiving, by the buffer chip, second control signals for setting a second memory chip;

buffering, by the buffer chip, the second control signals and transmitting the buffered second control signals to the second memory chip;

storing, by the buffer chip, a setting value for the second memory chip in response to the second control signals;

storing, by the second memory chip, the setting value for the second memory chip in response to the second control signals;

receiving, by the buffer chip, third control signals for applying the setting value for the second memory chip;

buffering, by the buffer chip, the third control signals and transmitting the buffered third control signals to the second memory chip;

applying, by the buffer chip, the stored setting value for the second memory chip as a setting value of the buffer chip in response to the third control signals; and applying, by the second memory chip, the stored setting value for the second memory chip as the setting value for the second memory chip in response to the third control signals.

5. The operation method of claim 4, further comprising:

receiving, by the buffer chip, fourth control signals for applying the setting value for the first memory chip;

buffering, by the buffer chip, the fourth control signals and transmitting the buffered fourth control signals to the first memory chip;

applying, by the buffer chip, the stored setting value for the first memory chip as the setting value of the buffer chip in response to the fourth control signals; and applying, by the first memory chip, the stored setting value for the first memory chip as a setting value for the first memory chip in response to the fourth control signals.

6. The operation method of claim 4, wherein the setting value includes at least one of a level of a reference voltage and a termination resistance value.

7. A buffer chip comprising:

a first command decoder configured to decode a first chip select signal and command address signals;

a second command decoder configured to decode a second chip select signal and the command address signals;

a first setting circuit configured to store setting values for a first memory chip according to a decoding result of the first command decoder;

a second setting circuit configured to store setting values for a second memory chip according to a decoding result of the second command decoder; and a buffer chip setting circuit configured to:

when application of the setting value for the first memory chip is instructed, receive one or more of the setting values stored in the first setting circuit and store the received setting value as a buffer chip setting value; and when application of the setting value for the second memory chip is instructed, receive one or more of the setting values stored in the second setting circuit and store the received setting value as the buffer chip setting value.

8. The buffer chip of claim 7, further comprising:

a command address reception circuit configured to receive the command address signals transmitted from a memory controller;

a first chip select signal buffer configured to receive the first chip select signal from the memory controller;

a second chip select signal buffer configured to receive the second chip select signal from the memory controller;

a command address transmission circuit configured to transmit the command address signals to the first memory chip and the second memory chip;

a first chip select signal driver configured to transmit the first chip select signal to the first memory chip; and a second chip select signal driver configured to transmit the second chip select signal to the second memory chip.

9. The buffer chip of claim 8, further comprising:

an external data interface configured to transmit and receive data to and from the memory controller;

an internal data interface configured to transmit and receive the data to and from the first memory chip and the second memory chip;

a first latency control circuit configured to control whether to activate the external data interface and the internal data interface by using latency setting values among the setting values of the first setting circuit during a read operation and a write operation of the first memory chip; and a second latency control circuit configured to control whether to activate the external data interface and the internal data interface by using latency setting values among the setting values of the second setting circuit during a read operation and a write operation of the second memory chip.

10. The buffer chip of claim 7, wherein the one or more setting values stored in the buffer chip setting circuit include at least one of a level of a reference voltage and a termination resistance value.

11. The buffer chip of claim 7, wherein, when the application of the setting value for the first memory chip is instructed, the buffer chip setting circuit is configured to receive one or more of the setting values stored in the first setting circuit and store the received setting value as the buffer chip setting value, and when the application of the setting value for the second memory chip is instructed, the buffer chip setting circuit is configured to receive one or more of the setting values stored in the second setting circuit and change the buffer chip setting value.

12. The buffer chip of claim 7, wherein, when the application of the setting value for the first memory chip and the application of the setting value for the second memory chip are simultaneously instructed, the buffer chip setting circuit is configured to receive one or more of the setting values stored in a predetermined setting circuit of the first setting circuit and the second setting circuit, and store the received setting value as the buffer chip setting value.

\* \* \* \* \*